Sept. 10, 1940.  O. C. DURYEA  2,214,244
CLOSED TOP RAILWAY CAR BODY
Filed July 15, 1937  2 Sheets-Sheet 1
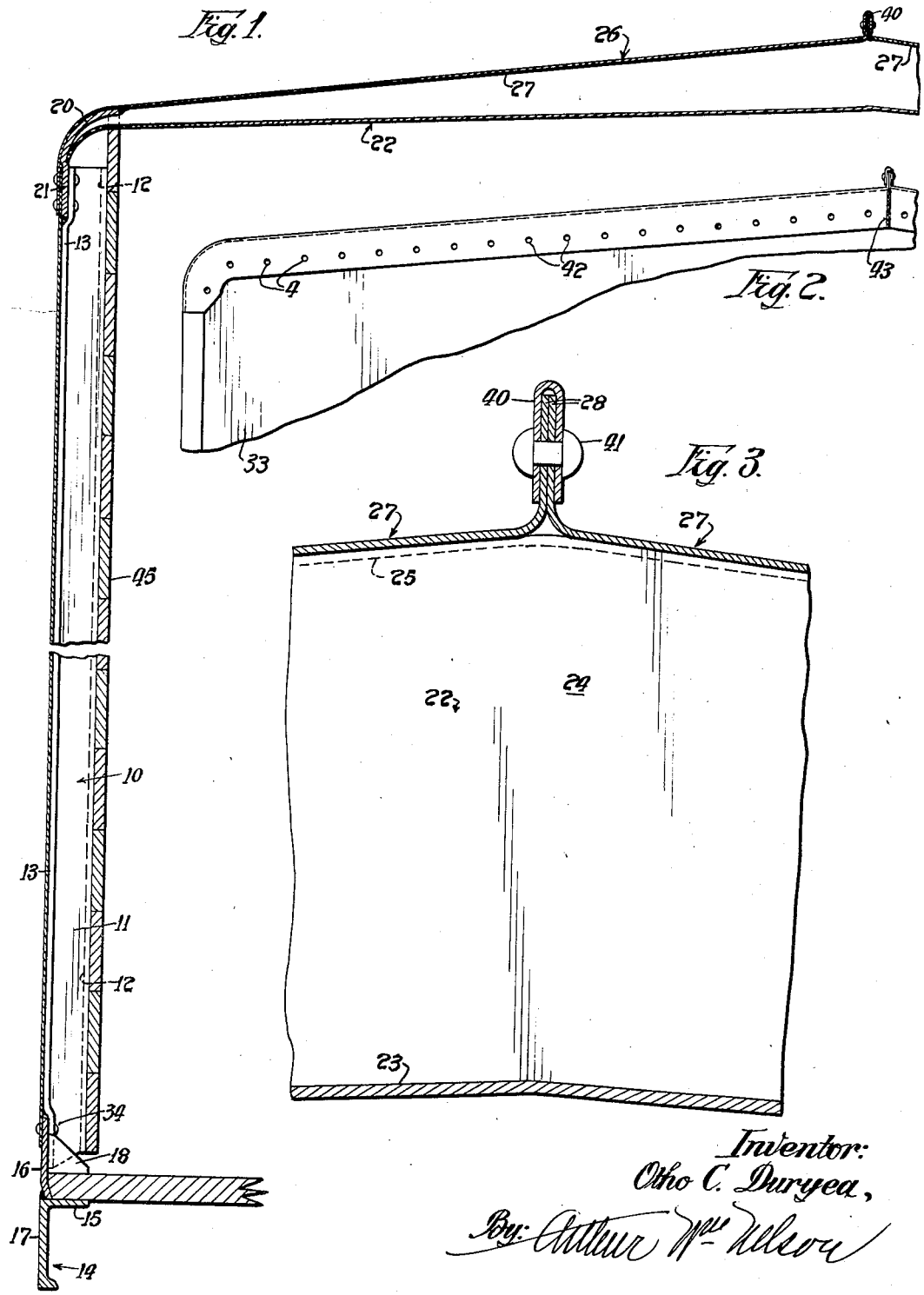
Inventor:
Otho C. Duryea,
By: Arthur W. Wilson
Attorney.

Sept. 10, 1940.　　　　O. C. DURYEA　　　　2,214,244
CLOSED TOP RAILWAY CAR BODY
Filed July 15, 1937　　　2 Sheets-Sheet 2
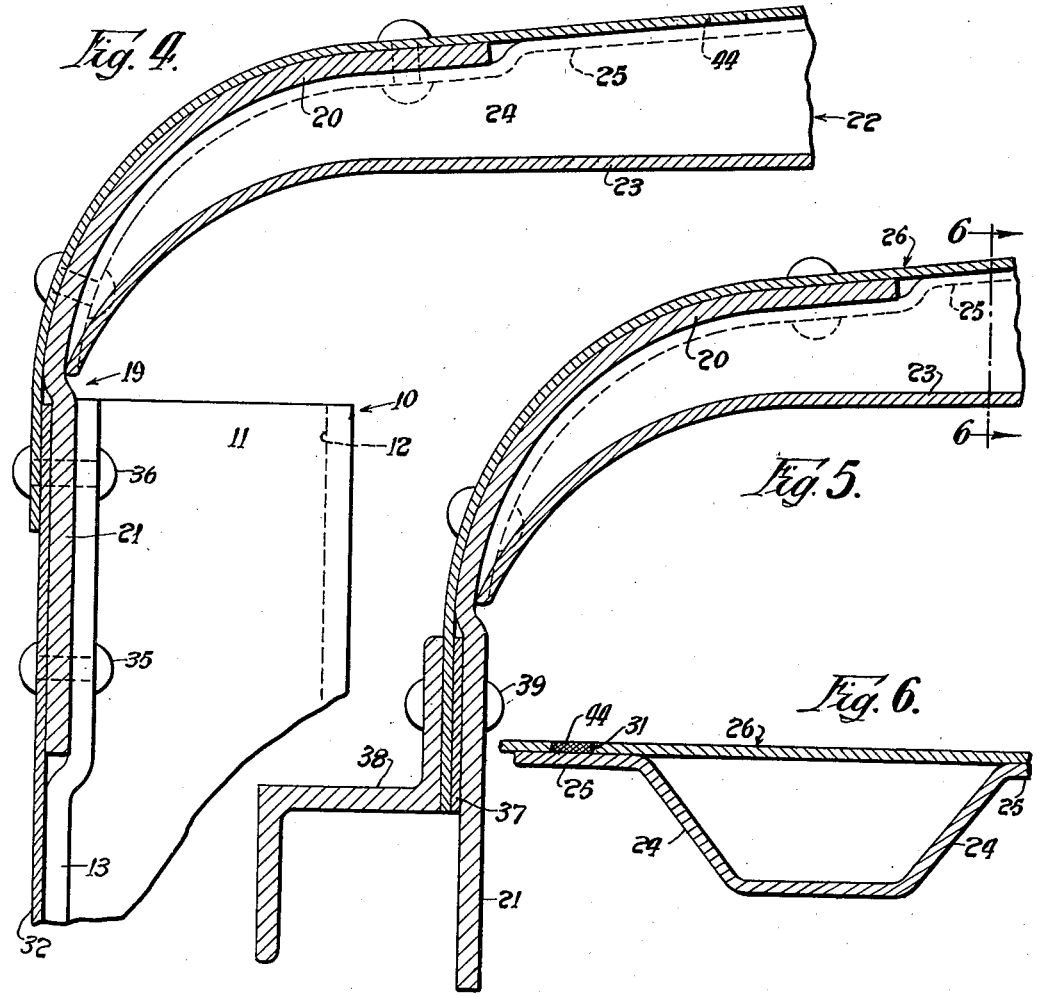
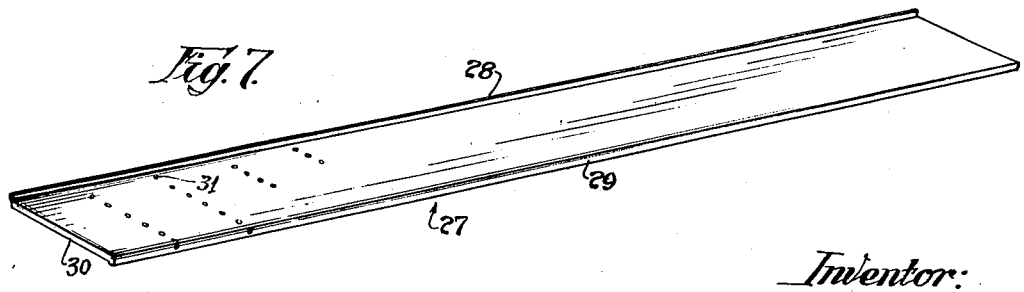
Inventor:
Otho C. Duryea,
By: Arthur W. Nelson
Attorney.

Patented Sept. 10, 1940

2,214,244

UNITED STATES PATENT OFFICE 2,214,244

CLOSED TOP RAILWAY CAR BODY

Otho C. Duryea, Waterbury, Conn.

Application July 15, 1937, Serial No. 153,711

2 Claims. (Cl. 108—54)

This invention relates to improvements in closed top railway car bodies and it consists of the matter hereinafter described and more particularly pointed out in the appended claims.

One of the objects of the present invention is to provide a closed top car body having a roof of novel construction comprising but two roof sections of the same pattern, each of the length of and one-half the width of the roof and formed for attachment together at the ridge and for attachment at one side and both ends to the sides and ends of the car body.

Another object of the invention is to provide a roof for a closed top car body which is devoid of rivets in its securement to the associated carlines to form a smooth, even surface thereof in which transverse seams and rivet heads are eliminated.

A further object of the invention is to provide as an article of manufacture, a roof section for a closed top car body made from a single metal plate, with parts forming a ridge flange, an eave portion and end flanges, the said section being of the length and one-half the width of the roof so that it may be used in connection with a like section, to make up the entire roof for the car body.

A further object of the invention is to provide in a closed top car body, a novel construction at the eaves of the roof and in which the side plates are fully enclosed against the weather and are of a simple rolled cross section and give more clearance space for the inside of the body at the eaves.

Again, it is an object of the invention to provide a closed top car body roof wherein the sections of the roof are secured to the carlines in a manner eliminating the use of rivets thus making a considerable saving in manufacturing costs.

The above mentioned objects of the invention as well as others will more fully appear as the specification proceeds.

In the drawings:

Fig. 1 is a transverse vertical sectional view through the roof and one side of a closed top railway car body embodying the preferred form of the invention.

Fig. 2 is a fragmentary view in elevation of an end of the improved car body.

Fig. 3 is a detailed transverse vertical sectional view, on an enlarged scale, through the ridge portion of the roof of the improved car body.

Fig. 4 is a detail transverse vertical sectional view also on an enlarged scale through an eave part of the car body, at a point spaced from the usual door opening.

Fig. 5 is a view similar to Fig. 4 showing the construction at the door opening.

Fig. 6 is a detail sectional view through a part of one of the carlines and associated part of a roof section, as taken in the line 6—6 of Fig. 5.

Fig. 7 is a perspective view of one of the roof sections of the improved car body.

Referring now in detail to that embodiment of the invention illustrated in the drawings: 10 indicates as a whole one of the upright side posts of the car body, it being understood that there is a plurality of such side posts arranged in longitudinally spaced relation along each side of the car body. Preferably each side post is of a Z bar cross section with its web 11 arranged transversely of the body and with its inner and outer flanges 12 and 13 facing in opposite directions longitudinally of the body. The bottom and top end portions of the outer flange 13 of each side post are offset inwardly as best shown in Fig. 1, for a purpose soon to appear.

14 indicates one of the side sills of the body as a whole. It is preferably of a T cross section in that it comprises a web and oppositely extending flanges. As shown herein the web 15 extends horizontally inward and its top and bottom flanges 16 and 17 are disposed vertically at the outside of the car body. The top flange engages in the inwardly offset bottom end of the outer flange 13 of the side posts so that the outer surface of said flanges are flush. The web 15 serves as a floor support, angle brackets 18 being employed to secure the flange 16 of the sill to the bottom ends of the side posts.

19 indicates one of the side plates as a whole. Each side plate is of a simple rolled cross section and includes an upwardly and inwardly curved top flange portion 20 and a vertically extending, inwardly offset bottom flange 21. The bottom flange 21 engages in the inwardly offset portions at the top end of the outer flanges of all of the side posts at the associated side of the car body so that the outer faces of said flanges are flush as best appears from Fig. 4. The manner in which the side plate is connected to the top end of the associated posts will appear later.

The side plate at one side of the car body is operatively connected to the side plate at the other side of the body by transversely extending, longitudinally spaced carlines 22. Preferably and as shown herein, each carline is made as an integral element, having its greatest vertical depth at the center or mid portion and tapering in such depth toward its ends. Each carline is preferably of a channel cross section to include a bottom web 23 and a pair of upwardly and outwardly diverging side walls 24—24 each of which terminates in an outwardly extending flange 25.

The flanges 25 of each carline, at the ends thereof are curved to conform to the underside of a side plate flange 20 with which they are engaged, said flanges 25 being offset inwardly as best appears in Fig. 4, so that the outer surface of the free margin of the side flange 20 is flush with the outer surfaces of the flanges 25. The manner in which the carline ends are attached to the flanges 20 of both side plates will appear later.

26 indicates the roof of the car body as a whole. The roof is made of two longitudinal metal plate sections 27—27 of the same pattern shape and each of a length corresponding to that of the car body and each of a width corresponding to one-half the width of the body. Each section, as best appears in Fig. 7, comprises a flat panel formed along one longitudinal margin with an upturned flange 28 and formed along the other longitudinal margin with a down turned eave portion 29 and further formed at each end with a downwardly directed flange 30 that extends from the ridge flange to the curved eave portion as best appears in Figs. 1 and 7. In the panel or body of the section are transverse pairs of rows of openings 31, the openings in each row being spaced longitudinally in accordance with the spacing between the flanges 25 of the carlines, the openings in each pair of rows being staggered.

The side sheathing of the car body is indicated at 32 and the end is indicated at 33. The side sheathing lies flush against the outer flanges 13 of the side posts and the bottom margin of said sheathing overlaps the top flange 16 of the sill 14. Rivets 34 pass through the bottom margin of the sheathing, the side sill flange portion 16 it overlaps, and the side post flange 13, with which said sill flange is engaged. The top end margin of the sheathing overlaps the inwardly offset vertical flange 21 of a side plate and terminates at the shoulder formed by the relatively offset parts of the side plate flanges. Rivets 35 pass through the top margin of the sheathing, the flange 21 of the side plate and the side post flange 13 with which the side plate flange 21 is engaged. After the side posts have been erected and before the sheathing has been applied, as before described, the carlines 22 are installed and temporarily secured in place with respect to the side plates. The car body ends 33—33 may be erected either before or after the carlines. With the side posts, carlines, side sheathing and ends, assembled as mentioned, the roof sections are then applied to the carlines, with the ridge flanges 28 substantially engaged, with the eave portions 29 engaged on the side plate flanges 20 and overlapping the top ends of the sheathing and with the end flanges 30 overlapping top end marginal portions of the ends 33. Rivets 36 are inserted through overlapping portions of the eave portions, side sheathing, side plate flange and side post flanges 13 as appears in Fig. 1.

Other rivets are then inserted through overlapping portions of the eave portions, side plate flanges 20 and engaged flanges 25 of the carlines 22 as best appears in Fig. 4. The door opening of each side of the car is disposed between a pair of adjacent side posts. At said door opening, a filler 37 is interposed between the bottom flange of the side plate and the bottom margin of the eave portion after which a head piece 38 of Z bar cross section secured in place by rivets 39. This head piece, in connection with the bottom flange 21 of the side plate, coacts to provide a guideway for the top end of the door (not shown) employed in connection with said opening, all as best appears in Fig. 5.

Either before or after said rivets have been applied, a cap strip 40 of inverted or U shaped cross section is applied to enclose the ridge flanges 28 of both roof section and then riveted thereto as indicated at 41. At this time the end flanges of both roof sections may be riveted to the associated ends as at 42 and the abutting inner end edges of the roof section end flanges 30 may be welded together as at 43 in Fig. 2.

When the roof section is in place as mentioned, the openings 31 in the transverse rows thereof will register with the flanges 25 of the carlines so as to expose portions of said flanges therethrough. Welding 44 is then laid in said openings to fill and close them and to secure the roof sections to the carlines, the welding being in the form of plugs. A lining 45 is then secured in place in engagement with the inner flanges of the side posts.

It is pointed out that both sections are identical, being of the same pattern form. This reduces cost of tooling for manufacture and which is reflected in the ultimate cost of the finished car body. By reason of the upstanding ridge flange and downturned eave portion in connection with the end flange, each roof section becomes inherently stiff and rigid in itself to ably resist torsional and other strains so that it cannot bend or twist out of shape. Thus each roof section in itself is devoid of extra parts for bracing the same. This also reduces manufacturing cost.

Again, such roof section will substantially nest for shipment to place of assembly with other correlated parts into a finished car body.

It is to be noted that the side plates are in no manner exposed to the weather elements but are entirely enclosed and that the eave portions of the roof sections provide a smooth water drain which cannot retain water to start corrosion. The roof structure described is completely watertight against leakage and fully protects the contents of the car against leakage damage.

While in describing the invention, I have referred in detail to the form arrangement and construction of the parts thereof, the same is to be considered only in the illustrative sense so that I do not wish to be limited thereto except as may be specifically set forth in the appended claims.

I claim as my invention:

1. In a closed top railway car body, the combination of means providing upright side posts, a side plate secured to the top end portions of said side posts and having an upwardly and inwardly extending portion arranged above the top ends of the side posts, means providing carlines each having an end portion fitting the underside of said portion of the side plate, side sheathing secured to said side posts, the top end of said sheathing overlapping a bottom marginal portion of the side plate, and roof sheathing secured to said carlines and having an eave portion extending down about the top margin of the side plate and overlapping the top margin of the side sheathing.

2. In a closed top railway car body, the combination of means providing a row of upright side posts along each side of the car body and having an inwardly offset top end portion, a side plate for each row of posts and having a bottom marginal portion engaged with said inwardly offset top end portion of the side posts in said row so that the outer surface of the side plate portion is substantially flush with the outer surface of the side posts, said side plate having an inwardly and upwardly curved top marginal portion, means providing roof carlines secured at one end to said inwardly and upwardly curved top marginal portion of each side plate, there being an offset in each side plate at the junction of the said two portions thereof, side sheathing secured to the row of side posts along each side of the car body and overlapping the first mentioned portion of the associated side plate to terminate at said junction and roof sheets having downwardly curved eave portions along each lateral margin engaged on and secured to said curved top marginal portion of an associated side plate and overlapping the top end portion of the sheathing.

OTHO C. DURYEA.